(12) United States Patent
Padhi et al.

(10) Patent No.: US 11,023,683 B2
(45) Date of Patent: Jun. 1, 2021

(54) OUT-OF-DOMAIN SENTENCE DETECTION

(71) Applicant: International Business Machines Corporation, Armonk, NY (US)

(72) Inventors: Inkit Padhi, White Plains, NY (US); Ruijian Wang, White Plains, NY (US); Haoyu Wang, Somerville, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 16/293,893

(22) Filed: Mar. 6, 2019

(65) Prior Publication Data

US 2020/0285702 A1 Sep. 10, 2020

(51) Int. Cl.
*G06N 3/00* (2006.01)
*G06N 3/08* (2006.01)
*G06F 40/30* (2020.01)
*G06N 3/04* (2006.01)

(52) U.S. Cl.
CPC .......... *G06F 40/30* (2020.01); *G06N 3/0445* (2013.01); *G06N 3/08* (2013.01); *G06N 3/088* (2013.01)

(58) Field of Classification Search
CPC ........ G06F 40/30; G06N 3/0445; G06N 3/08; G06N 3/088
See application file for complete search history.

(56) References Cited

U.S. PATENT DOCUMENTS

| | | | |
|---|---|---|---|
| 9,710,462 | B2 | 7/2017 | Sanders et al. |
| 9,710,463 | B2 | 7/2017 | Prasad et al. |
| 9,959,271 | B1 | 5/2018 | Goyal et al. |
| 10,134,389 | B2 | 11/2018 | Hakkani-Tur et al. |
| 10,528,666 | B2 * | 1/2020 | Min ................. G06N 3/04 |

(Continued)

FOREIGN PATENT DOCUMENTS

EP 1772854 A1 11/2014

OTHER PUBLICATIONS

Kim Joo-Kyung, et al., "Joint Learning of Domain Classification and Out-of-Domain Detection with Dynamic Class Weighting for Satisficing False Acceptance Rates", arXiv:1807.00072v1 [cs.CL], Jun. 28, 2018.

(Continued)

*Primary Examiner* — Sonia L Gay
(74) *Attorney, Agent, or Firm* — Jeffrey G. Toler; Brian M. Restauro

(57) ABSTRACT

A computer-implemented method includes obtaining a training data set including text data indicating one or more phrases or sentences. The computer-implemented method includes training a classifier using supervised machine learning based on the training data set and additional text data indicating one or more out-of-domain phrases or sentences. The computer-implemented method includes training an autoencoder using unsupervised machine learning based on the training data. The computer-implemented method further includes combining the classifier and the autoencoder to generate the out-of-domain sentence detector configured to generate an output indicating a classification of whether input text data corresponds to an out-of-domain sentence. The output is based on a combination of a first output of the classifier and a second output of the autoencoder.

20 Claims, 9 Drawing Sheets

(56) References Cited

U.S. PATENT DOCUMENTS

| | | |
|---|---|---|
| 2006/0277028 A1 | 12/2006 | Chen et al. |
| 2014/0236570 A1 | 8/2014 | Heck et al. |
| 2016/0055240 A1 | 2/2016 | Tur et al. |
| 2016/0283851 A1 | 9/2016 | Bufe et al. |
| 2017/0270912 A1 | 9/2017 | Levit et al. |
| 2019/0205733 A1* | 7/2019 | Ghaeini ............... G06N 3/0454 |

OTHER PUBLICATIONS

Lane, Ian R., et al., "Out-Of-Domain Detection Based on Confidence Measures From Multiple Topic Classification", IEEE International Conference on Acoustics, Speech, and Signal Processing, May 17-21, 2004.

Ryu Seonghan, et al., "Exploiting Out-of-Vocabulary Words for Out-of-Domain Detection in Dialog Systems", International Conference on Big Data and Smart Computing (BIGCOMP), Jan. 15-17, 2014.

Ryu Seonghan, et al., "Neural sentence embedding using only in-domain sentences for out-of-domain sentence detection in dialog systems", arXiv:1807.11567 [cs.CL], 2017.

Sun Ming, et al., "Understanding User's Cross-Domain Intentions in Spoken Dialog Systems", NIPS Workshop on Machine Learning for SLU and Interaction, Dec. 2015.

* cited by examiner

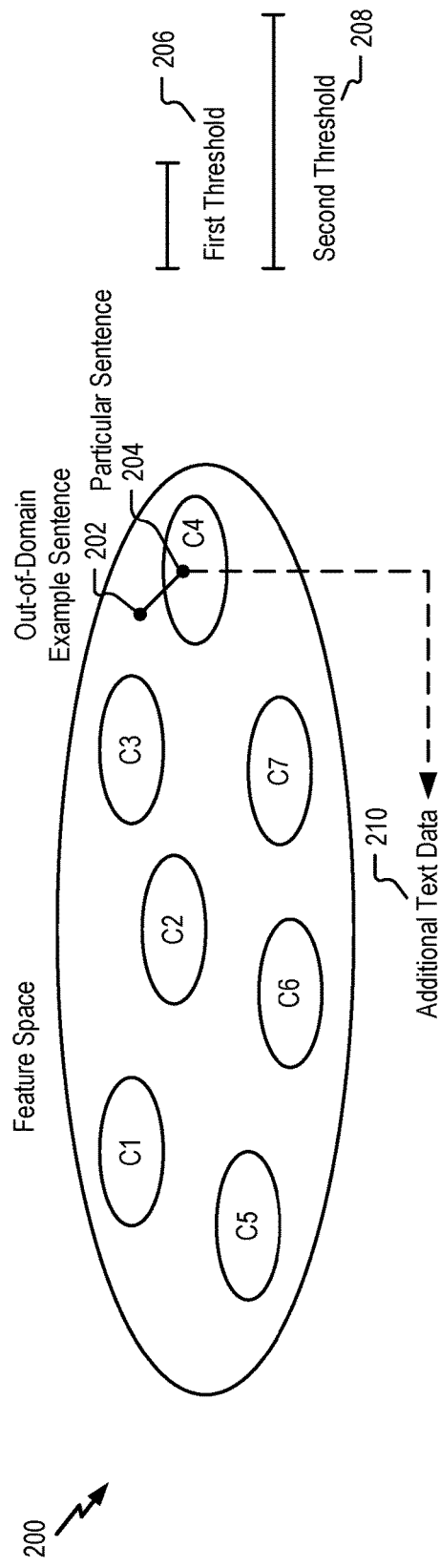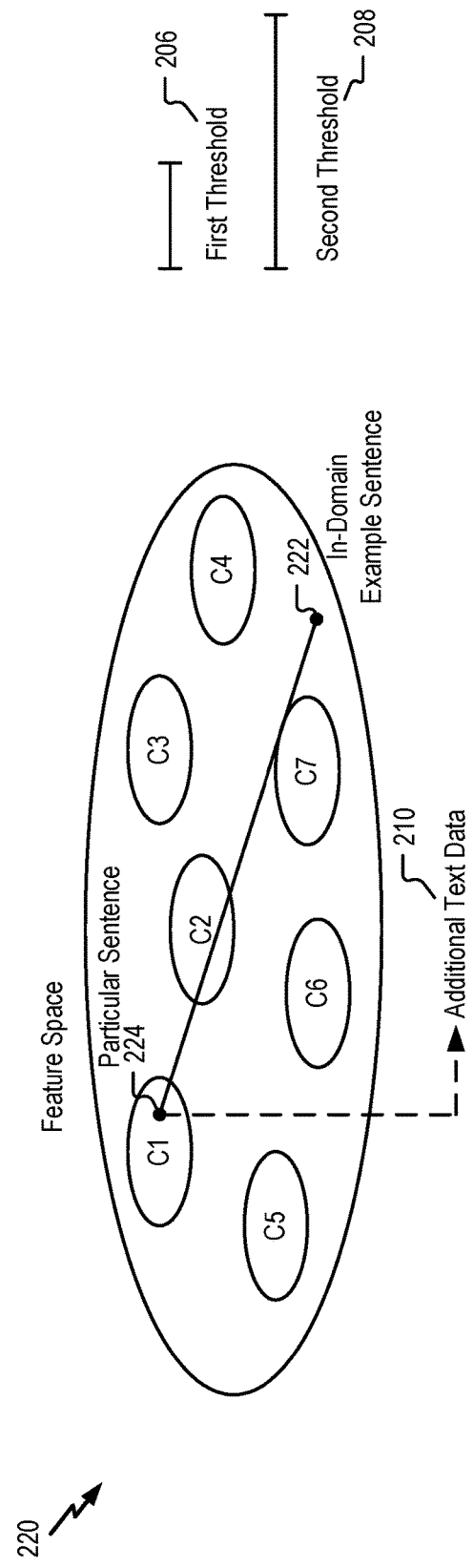

OUT-OF-DOMAIN SENTENCE DETECTION

BACKGROUND

The present invention relates to out-of-domain sentence detection, and more specifically, to training an out-of-domain sentence detector.

SUMMARY

According to an embodiment of the present disclosure, a computer-implemented method for training an out-of-domain sentence detector includes obtaining a training data set including text data indicating one or more phrases or sentences. The computer-implemented method includes training a classifier using supervised machine learning based on the training data set and additional text data indicating one or more out-of-domain phrases or sentences. The computer-implemented method includes training an autoencoder using unsupervised machine learning based on the training data. The computer-implemented method further includes combining the classifier and the autoencoder to generate the out-of-domain sentence detector configured to generate an output indicating a classification of whether input text data corresponds to an out-of-domain sentence. The output is based on a combination of a first output of the classifier and a second output of the autoencoder.

According to an embodiment of the present disclosure, an apparatus includes a processor and a memory coupled to the processor and storing instructions that, when executed by the processor, cause the processor to perform operations including obtaining a training data set including text data indicating one or more phrases or sentences. The operations include training a classifier using supervised machine learning based on the training data set and additional text data indicating one or more out-of-domain phrases or sentences. The operations include training an autoencoder using unsupervised machine learning based on the training data. The operations include combining the classifier and the autoencoder to generate an out-of-domain sentence detector configured to generate an output indicating a classification of whether input text data corresponds to an out-of-domain sentence. The output is based on a combination of a first output of the classifier and a second output of the autoencoder.

According to an embodiment of the present disclosure, a computer program product for training an out-of-domain sentence detector includes a computer readable storage medium having program instructions embodied therewith. The program instructions are executable by a processor to cause the processor to perform operations including obtaining a training data set including text data indicating one or more phrases or sentences. The operations include training a classifier using supervised machine learning based on the training data set and additional text data indicating one or more out-of-domain phrases or sentences. The operations include training an autoencoder using unsupervised machine learning based on the training data. The operations further include combining the classifier and the autoencoder to generate the out-of-domain sentence detector configured to generate an output indicating a classification of whether input text data corresponds to an out-of-domain sentence. The output is based on a combination of a first output of the classifier and a second output of the autoencoder.

BRIEF DESCRIPTION OF THE DRAWINGS

FIGS. 2A-2B are examples of selecting sentences for use as additional text data in training the classifier included in the out-of-domain sentence detector of FIG. 1;

DETAILED DESCRIPTION

Figure 1:
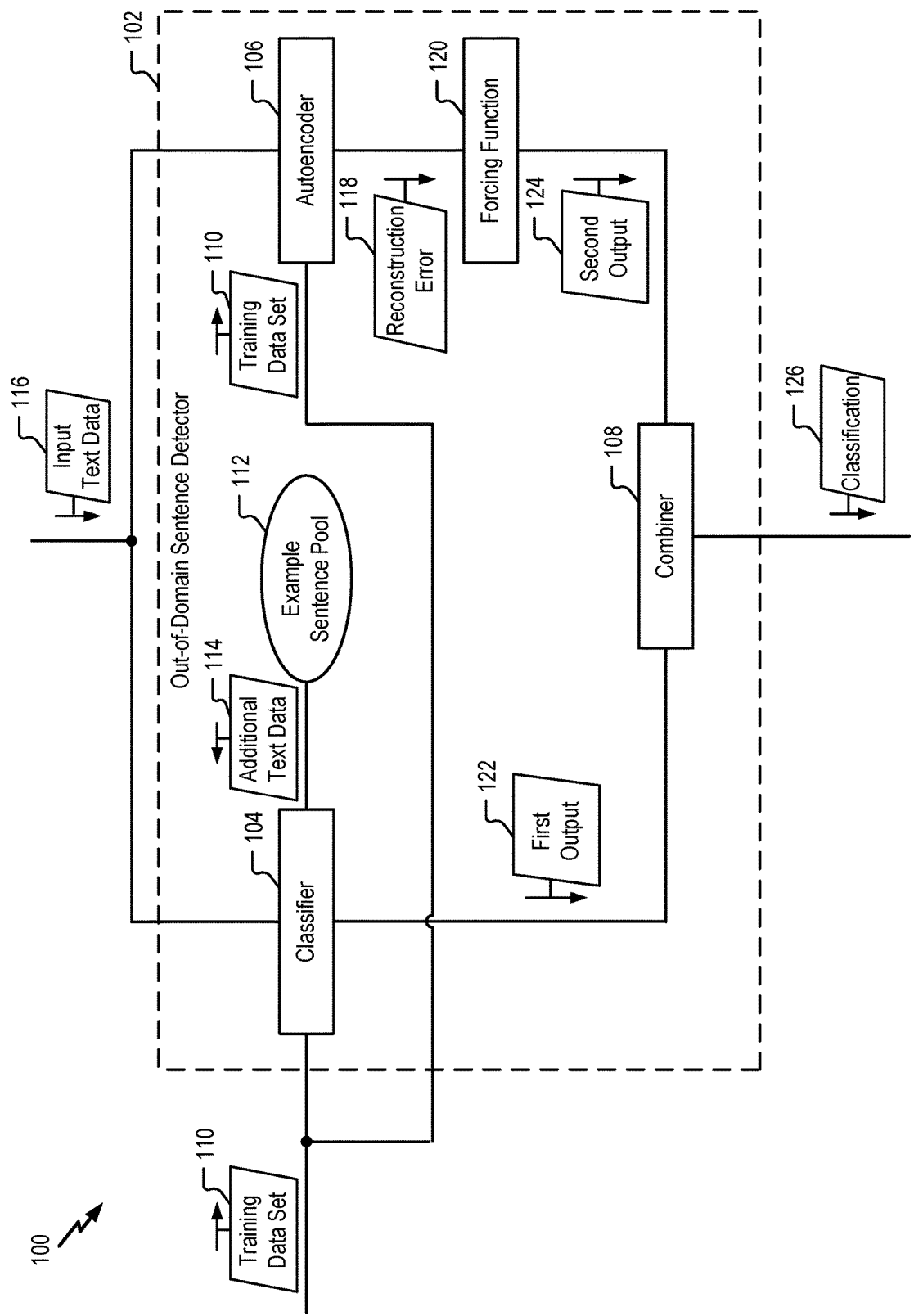
FIG. 1 is a block diagram of a system that is operable to train an out-of-domain sentence detector.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As dialogue systems become more popular as a cloud artificial intelligence (AI) service, a challenge becomes identifying requests that are out-of-domain, and may result in unpredictable responses. For example, the domain refers to the type of expected questions or requests for a particular dialogue system (e.g., questions or requests that have to do with the purpose of the dialogue system). To further illustrate, a cloud dialogue service that is designed to provide weather-related information would not expect to receive a question about who is the director of a movie (e.g., this is an out-of-domain question). The present disclosure describes systems, apparatus, methods, and computer program products for training an out-of-domain sentence detector. The out-of-domain sentence detector of the present disclosure combines (e.g., is an ensemble approach of) two different machine learning models: a classifier and an autoencoder, to provide a more robust and accurate out-of-domain sentence detector.

To illustrate, the out-of-domain sentence detector of the present disclosure includes a classifier that is trained using a training data set of in-domain training examples and additional text data including out-of-domain examples. The training data set includes in-domain sentences or phrases that are provided by a customer. The additional text data can include out-of-domain sentences or phrases that are provided by a customer, in addition to out-of-domain sentences or phrases that are retrieved from an example sentence pool (e.g., an external corpus) that is accessible to the classifier. In some implementations, the training process disclosed herein provides relatively the same number of in-domain training examples as out-of-domain training examples. If fewer than a target number of out-of-domain training examples are provided (or if no out-of-domain training examples are provided), the out-of-domain training examples are retrieved from the example sentence pool. For example, the example sentences in the pool may be clustered into clusters in a feature space, and based on a distance between a training example and sentences in the clusters, one or more sentences from the pool may be selected as out-of-domain training examples. As a first example, an out-of-domain example sentence provided by the customer may be mapped into the feature space, and if a distance between the out-of-domain example sentence and a particular example sentence from the pool fails to satisfy the threshold (e.g., the particular example sentence is sufficiently similar to the out-of-domain example sentence), the particular example sentence is selected as an out-of-domain example sentence. As a second example, an in-domain example sentence provided by the customer may be mapped into the feature space, and if a distance between the in-domain example sentence and a particular example sentence from the pool satisfies a second threshold (e.g., the particular example sentence is sufficiently dissimilar to the in-domain example sentence), the particular example sentence is selected as an out-of-domain example sentence. Thus, regardless of whether the training data set includes out-of-domain example sentences, out-of-domain example sentences can be retrieved from the example sentence pool for use in training the classifier.

The out-of-domain sentence detector of the present disclosure also includes an autoencoder. The autoencoder is trained using unsupervised learning based on the in-domain training examples of the training data set. Because in-domain sentences have a common distribution, the autoencoder is able to learn an encoding of an in-domain sentence. Further, a reconstruction error output by the autoencoder can be used to indicate whether the input text is an in-domain sentence (or an out-of-domain sentence). A forcing function, such as a sigmoid function, may be applied to the reconstruction error to generate an output that is combined with an output of the classifier. For example, the combination may be an average or a weighted average of the two outputs, or a result of a voting process (e.g., if either or both outputs indicate out-of-domain, the result may be classified as an out-of-domain sentence (or vice versa)). The output (e.g., a classification) indicates a classification of whether input text data provided to the out-of-domain sentence classifier is an out-of-domain sentence (or an in-domain sentence). The classification is used to determine a next action for a system to perform. For example, if the classification indicates an in-domain sentence, the in-domain sentence is sent for further processing, such as intent detection, in order to generate a response. If the classification indicates an out-of-domain sentence, the system may issue a prompt to a user indicating that their request is outside the scope of the system.

One advantage provided by the systems, methods, and computer program products described herein is the generation and training of an out-of-domain sentence detector that is more robust and more accurate than other out-of-domain sentence detectors. For example, by combining the outputs of the classifier and the autoencoder, the out-of-domain sentence detector of the present disclosure may be more accurate in situations where the out-of-domain sentences are too similar to the in-domain sentences, which may cause difficulties for the classifier, and in situations where one or more in-domain sentences are different than the other in-domain sentences, which may cause difficulties for the autoencoder.

With reference to FIG. 1, a system 100 for training an out-of-domain sentence detector 102 is shown. In the illustrated example, the out-of-domain sentence detector 102 includes a classifier 104, an autoencoder 106, a forcing function 120, and a combiner 108. The classifier 104 is coupled to the combiner 108. The autoencoder 106 is coupled to the forcing function 120. The forcing function 120 is coupled to the combiner 108.

In a particular implementation, each of the elements 102-108 and 120 corresponds to hardware. For example, the elements 102-108 and 120 may be embodied in a processor, a controller, a field-programmable gate array (FPGA), an application-specific integrated circuit (ASIC), or another form of hardware. In other implementations, the operations described with reference to the elements 102-108 and 120 are performed by a processor executing computer-readable instructions, as further described with reference to FIG. 4.

The system 100 is configured to obtain a training data set 110. The training data set 110 includes a plurality of training examples. Each training example includes text data of a respective phrase or sentence. Each training example also includes a class (e.g., domain) label for the phrase or sentence. For example, each training example is labeled as either in-domain or out-of-domain. In some implementations, the training data set 110 is provided to the system 100, such as being stored on a memory accessible (or included in) the system 100 or being received from another device via network transmission. In a particular implementation, the training data set 110 has already been stored as text data. Alternatively, audio data may be provided, and automatic speech recognition and text to speech conversion may be performed on the audio data to generate the training data set 110.

The training examples of the training data set 110 are generated by an end-user for the out-of-domain sentence detector 102, such as a customer of a producer of the system 100. The training examples may correspond to examples of speech, such as questions, commands, etc., that are expected to be received from users of a voice response system that integrates the out-of-domain sentence detector 102. The out-of-domain sentence detector 102 is trained based on the training data set 110 to detect inputs to the response system that are outside the scope of what the response system is designed to handle. For example, if the response system is a weather response system, a query such as "what is today's high temperature" would be considered in-domain, while a query such as "what is the capital of Montana" would be considered out-of-domain. Out-of-domain requests are handled differently than in-domain requests, as further described herein, to prevent a user from receiving a response that is outside of the user's expectations.

The training data set 110 may include as few as five to ten training examples, or as many as millions of training examples, depending on the customer and how much information is known ahead of time. Each of the training examples is labeled to indicate whether the respective training example is in-domain or out-of-domain, for use in supervised learning, as further described herein. The training examples may also include text from one or multiple languages.

The training data set 110 is used to train the classifier 104. To illustrate, the training data set 110 is provided to the classifier 104 to train the classifier 104 to classify input text as an in-domain sentence or as an out-of-domain sentence. In a particular implementation, the classifier 104 is a binary classifier that is configured to output a first value (indicating a classification as in-domain) or a second value (indicating a classification as out-of-domain).

In order to train the classifier 104, training data provided to the classifier 104 should include both examples of in-domain sentences (or phrases) and out-of-domain sentences (or phrases), so that the classifier 104 can learn, through supervised learning, the boundary between an in-domain sentence and an out-of-domain sentence. To efficiently train the classifier 104, the number of in-domain training examples should be substantially equal to the number of out-of-domain training examples. However, if a customer provides out-of-domain training examples at all, it is likely the customer does not provide as many out-of-domain training examples as in-domain training examples. Thus, the system 100 is configured to determine additional text data 114 to provide to the classifier 104 along with the training data set 110 for training the classifier 104. The additional text data 114 includes out-of-domain training examples.

In a particular implementation, some of the additional text data 114 (e.g., the out-of-domain training examples) is received from the customer. Additionally, a portion of the additional text data 114 (or an entirety, if no out-of-domain training examples are received from the customer) is obtained from an example sentence pool 112. The example sentence pool 112 includes a corpus of example sentences (or phrases). In a particular implementation, the example sentence pool 112 is stored at a memory of the system 100. In an alternate implementation, the example sentence pool 112 is stored externally and is accessible to the system 100.

In a particular implementation, the example sentences in the example sentence pool 112 are clustered into a plurality of clusters in a feature space. The clustering may be performed using any clustering technique, such as a K-Means, DBSCAN, or other clustering techniques. The size of the clusters may be set as a hyperparameter to control the performance, efficiency, and memory usage of the system 100. In this implementation, example sentences from the example sentence pool 112 are selected for inclusion in the additional text data 114 based on a distance in the feature space between a training example and the example sentence.

As a first example, an out-of-domain training example (e.g., from the training data set 110) is used to select a similar sentence from the example sentence pool 112 that is to be used as an out-of-domain training example. To illustrate, the out-of-domain training example is mapped into the feature space of the example sentence pool 112. A distance in the feature space between the out-of-domain training example and an example sentence of the nearest cluster is determined. If the distance fails to satisfy a first threshold (e.g., is less than the first threshold), the example sentence is selected for inclusion in the additional text data 114. In a particular implementation, the distance is a cosine distance. In another particular implementation, the distance is an $L^2$ distance. In this manner, sentences that are similar to received out-of-domain training examples (e.g., based on distance in the feature space) are selected as additional out-of-domain training examples. This example is further described with reference to FIG. 2A.

As a second example, an in-domain training example (e.g., from the training data set 110) is used to select a dissimilar sentence from the example sentence pool 112 that is to be used as an out-of-domain training example. To illustrate, the in-domain training example is mapped into the feature space of the example sentence pool 112. A distance in the feature space between the in-domain training example and an example sentence of the farthest cluster is determined. If the distance satisfies a second threshold (e.g., is greater than or equal to the second threshold), the example sentence is selected for inclusion in the additional text data 114. The distance may be a cosine distance, an $L^2$ distance, or another type of distance. In this manner, sentences that are sufficiently dissimilar to received in-domain training examples (e.g., based on distance in the feature space) are selected as out-of-domain training examples. This example is further described with reference to FIG. 2B.

A number of example sentences are obtained from the example sentence pool 112 such that the number of in-domain examples and out-of-domain examples are substantially equal. For example, if twenty in-domain sentence examples are included in the training data set 110 and two out-of-domain example sentences are also included in the training data set 110 (or otherwise received from the customer), eighteen out-of-domain example sentences are retrieved from the example sentence pool 112 as the additional text data 114. After obtaining the additional text data 114 (e.g., the out-of-domain example sentences), the training data set 110 and the additional text data 114 are used to train the classifier 104 to classify input text as either in-domain or out-of-domain. An output of the classifier 104 is combined with an output of the autoencoder by the combiner 108, as further described herein.

The training data set 110 is also used to train the autoencoder 106. The autoencoder 106 is configured to learn, using unsupervised learning, the distribution of in-domain data. To illustrate, the in-domain training examples of the training data set 110 (without the labels) are provided to the autoencoder 106 to train the autoencoder 106 to learn a representation (e.g., an encoding) of the in-domain training examples in an unsupervised manner. Along with learning the encoding, the autoencoder 106 is also configured to generate a reconstruction from a reduced representation that is as close as possible to the original input. In a particular implementation, proving the training data set 110 to the autoencoder 106 includes generating one or more embedding vectors based on the training data set 110 and providing the one or more embedding vectors to the autoencoder 106, as further described with reference to FIG. 3.

A reconstruction error 118 output by the autoencoder 106 indicates how well the autoencoder 106 has performed at reconstruction, and can be used to indicate whether the original input is in-domain or out-of-domain. For example, if the original input is in-domain, the reconstruction error 118 should be relatively small. If the original input is out-of-domain, the reconstruction error 118 should be relatively large (e.g., satisfy a threshold). Thus, the reconstruction error 118 output by the autoencoder 106 can be used to indicate whether input text is in-domain or out-of-domain.

The forcing function 120 is applied to the reconstruction error 118 to generate an output for combination with the output of the classifier 104. For example, the forcing function 120 may be applied to the reconstruction error 118 to generate a value that can be more easily combined with the output of the classifier 104 (e.g., a binary digit). In a particular implementation, the forcing function 120 includes a sigmoid function to force the reconstruction error 118 to be a binary digit.

The combiner 108 is configured to combine outputs of the classifier 104 and the autoencoder 106 to generate a combined output that represents a classification of whether input text is in-domain or out-of-domain. Thus, the combiner 108 effectively combines the classifier 104 and the autoencoder 106 to form the out-of-domain sentence detector 102. In a particular implementation, the combiner 108 is configured to perform an average of the output of the classifier 104 and a value based on the output of the autoencoder 106 (e.g., after application of the forcing function 120). In another particular implementation, the combiner 108 is configured to perform a weighted average of the output of the classifier 104 and a value based on the output of the autoencoder 106 (e.g., after application of the forcing function 120). The weights applied to the outputs may depend on a target reliance rate for each of the classifier 104 or the autoencoder 106. In some implementations, the weights may be based on the training data set 110, which may indicate situations in which either the classifier 104 or the autoencoder 106 is more likely to be accurate. For example, if there are multiple out-of-domain training examples included in the training data set 110, the weighting for the classifier 104 may be increased, while if there are a large number of in-domain training examples in the training data set 110, the weighting for the autoencoder 106 may be increased. In another particular implementation, the combiner 108 is configured to combine the outputs using a voting function. For example, if either or both of the outputs indicate an out-of-domain sentence, the final output is classified as an out-of-domain sentence. Alternatively, in another example, if either or both of the outputs indicate an in-domain sentence, the final output is classified as an in-domain sentence.

During operation, the out-of-domain sentence detector 102 may be operated in a training mode or in a use mode. During operation in the training mode, the out-of-domain sentence detector 102 is trained by providing the training data set 110 to the classifier 104 and to the autoencoder 106. The additional text data 114 is also used to train the classifier 104. In a particular implementation, the training data set 110 and at least a portion of the additional text data 114 are obtained from a customer (e.g., the customer provides in-domain training examples and out-of-domain training examples). Additionally, at least a portion of the additional text data 114 may be obtained from the example sentence pool 112. For example, based on distances in a feature space between clusters of sentences in the example sentence pool 112 and training examples (either in-domain or out-of-domain), sentences for the example sentence pool 112 may be selected for inclusion in the additional text data 114, as further described with reference to FIGS. 2A and 2B. In a particular implementation, the number of out-of-domain training examples selected for inclusion in the additional text data 114 is the same as the number of the in-domain training examples included in the training data set 110.

After training the out-of-domain sentence detector 102 (e.g., after training the classifier 104 and the autoencoder 106), the out-of-domain sentence detector 102 is operated in a use mode to classify received input text. For example, the out-of-domain sentence detector 102 receives input text data 116, such as from a user interface or as a result of automatic speech recognition. The input text data 116 is provided to the classifier 104 and to the autoencoder 106. The classifier 104 generates a first output 122 that indicates whether the input text data 116 is an in-domain sentence (or phrase) or an out-of-domain sentence (or phrase). The autoencoder 106 generates a representation of the input text data 116 and reconstructs the representation. As a result, the autoencoder 106 outputs the reconstruction error 118. If the reconstruction error 118 satisfies a threshold, the reconstruction error 118 indicates that the input text data 116 is an out-of-domain sentence (or phrase), and if the reconstruction error 118 fails to satisfy the threshold, the reconstruction error 118 indicates that the input text data 116 is an in-domain sentence.

The forcing function 120, such as a sigmoid function or other activation function, is applied to the reconstruction error 118 to generate a second output 124 that indicates a classification of the input text data 116 by the autoencoder 106. The combiner 108 combines the first output 122 with the second output 124 to generate a classification 126 that indicates whether the input text data 116 is an in-domain sentence (or phrase) or an out-of-domain sentence (or phrase). For example, the combiner 108 may average, or perform a weighted average, on the first output 122 and the second output 124, to generate the classification 126. Based on the classification 126, a system executing the out-of-domain sentence detector 102 may perform one or more operations. For example, if the classification 126 indicates that the input text data 116 is an in-domain sentence (or phrase), the input text data 116 may be provided to an intent classifier to process the input text data 116 and to determine a response to the input text data 116. If the classification 126 indicates that the input text data 116 is an out-of-domain sentence (or phrase), the system may issue a prompt advising the user to input a more on-topic request, instead of processing the input text data 116 and potentially providing a response that does not make sense to the user.

The out-of-domain sentence detector 102 may be stored at a memory (for execution by the system 100) or transmitted to another device for use by the other device. In a particular implementation, the out-of-domain sentence detector 102 may be deployed as part of a virtual "chat-bot" that enables users to ask questions from their computer and receive answers based on the text of the questions. For example, the chat-bot may display a support prompt, and a user may enter text or voice commands in response to the support prompt. In this implementation, the out-of-domain sentence detector 102 is software (or a part of software) that may be executed at the system 100 or another device to determine whether text input is out-of-domain or in-domain, such that appropriate actions may be taken. Thus, at a high-level, the system 100 is configured to generate software.

One advantage provided by system 100 is the generation and training of the out-of-domain sentence detector 102 that is more robust and more accurate than other out-of-domain sentence detectors. For example, by combining the outputs of the classifier 104 and the autoencoder 106, the out-of-domain sentence detector 102 may be more accurate in situations where the out-of-domain sentences are too similar to the in-domain sentences, which may cause difficulties for the classifier 104, and in situations where one or more in-domain sentences are different than the other in-domain sentences, which may cause difficulties for the autoencoder 106.

Additionally, the out-of-domain sentence detector 102 experiences the benefits of both underlying models, such as the easy interpretability and simple threshold definition of the classifier 104 and the easier training (e.g., without out-of-domain training examples) of the autoencoder 106. By accurately detecting out-of-domain sentences, proper actions may be taken, such as requesting a user to resubmit a request that is more on-topic, instead of providing a response that is possibly outside of what the user would expect to a given request.

FIGS. 2A and 2B are examples of selecting sentences for use as additional text data, such as the additional text data 114, in training the classifier 104 in the out-of-domain sentence detector 102 of FIG. 1.

FIG. 2A illustrates a first example 200. In this example, the example sentences of the example sentence pool 112 have been mapped to a feature space. For example, each example sentence is converted to an N-sized feature vector (e.g., by extracting features from the example sentences), and the feature space is an N-dimensional feature space where each dimension corresponds to a feature. Distances in the feature space represent similarity between the example sentences (e.g., an example sentence that is near another example sentence is similar to the example sentence, and an example sentence that is farther away from another example sentence is less similar to the other example sentence). Additionally, a clustering operation has been performed on the example sentences. For example, a K-Means clustering operation, a DBSCAN clustering operation, or another type of clustering operation has been performed. The clustering operation generates clusters of example sentences in the feature space based on the similarity of the various example sentences. As a result, the example sentences have been clustered into seven clusters: cluster C1, cluster C2, cluster C3, cluster C4, cluster C5, cluster C6, and cluster C7. Although seven clusters are illustrated in FIG. 2A, such example is not limiting, and in other examples the example sentences may be clustered into more than seven or fewer than seven clusters.

In the example of FIG. 2A, an out-of-domain example sentence 202 is obtained, such as from a customer. The out-of-domain example sentence 202 is mapped into the feature space. For example, the out-of-domain example sentence 202 has been mapped to a location in the feature space illustrated in FIG. 2A. If other out-of-domain examples are to be selected from the example sentence pool 112, the nearest cluster to the out-of-domain example sentence 202 is determined. In the example of FIG. 2A, the nearest cluster is cluster C4. A particular sentence 204 is selected from cluster C4, and a distance in the feature space between the particular sentence 204 and the out-of-domain example sentence 202 is determined. For example, a cosine or $L^2$ distance may be determined. If the distance fails to satisfy (e.g., is less than) a first threshold 206, then the particular sentence 204 is sufficiently similar to the out-of-domain example sentence 202, and the particular sentence 204 is identified as an out-of-domain sentence and is selected for inclusion in additional text data 210. The additional text data 210 may include or correspond to the additional text data 114. If the distance satisfies the first threshold 206, then the particular sentence 204 is determined not to be an out-of-domain sentence and is not included in the additional text data 210.

FIG. 2B illustrates a second example 220. Similar to the example of FIG. 2A, the example sentences of the example sentence pool 112 have been mapped to the feature space, and a clustering operation has been performed on the example sentences resulting in the clusters C1-C7. Although seven clusters are illustrated in FIG. 2B, such example is not limiting, and in other examples the example sentences may be clustered into more than seven or fewer than seven clusters.

In the example of FIG. 2B, an in-domain example sentence 222 is obtained, such as from a customer. The in-domain example sentence 222 is mapped into the feature space. For example, the in-domain example sentence 222 has been mapped to a location in the feature space illustrated in FIG. 2B. To select out-of-domain examples from the example sentence pool 112, the farthest cluster from the in-domain example sentence 222 is determined. In the example of FIG. 2B, the farthest cluster is cluster C1. A particular sentence 224 is selected from cluster C1, and a distance in the feature space between the particular sentence 224 and the in-domain example sentence 222 is determined. For example, a cosine or $L^2$ distance may be determined. If the distance satisfies (e.g., is greater than or equal to) a second threshold 208, then the particular sentence 224 is sufficiently dissimilar to the in-domain example sentence 222, and the particular sentence 224 is identified as an out-of-domain sentence and is selected for inclusion in additional text data 210. If the distance fails to satisfy the second threshold 208, then the particular sentence 224 is determined not to be an out-of-domain sentence and is not included in the additional text data 210.

Thus, FIGS. 2A and 2B illustrate examples of selecting example sentences from the example sentence pool 112 for use as out-of-domain training examples for the classifier 104. FIG. 2A illustrates an example of selecting out-of-domain training examples based on an out-of-domain training sample. FIG. 2B illustrates an example of selecting out-of-domain training examples based on an in-domain training example. By selecting a sufficient number of out-of-domain training examples, such that the number of in-domain training examples and the number of out-of-domain training examples are substantially equal, accuracy of the classifier 104 is improved.

Figure 3:
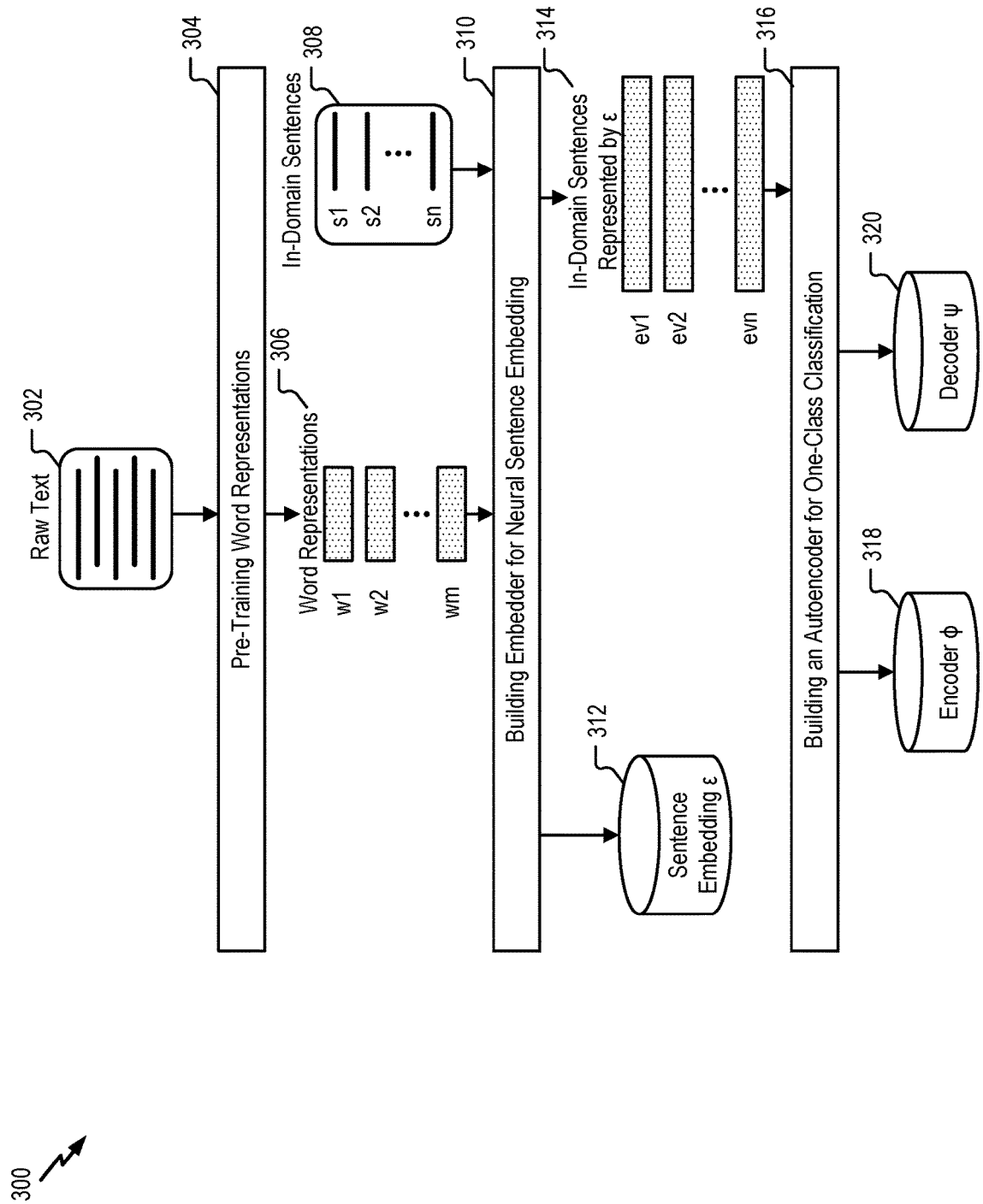
FIG. 3 is a diagram of an example of building an autoencoder included in the out-of-domain sentence detector of FIG. 1.

FIG. 3 illustrates a diagram of an example 300 of building an autoencoder, such as the autoencoder 106 in the out-of-domain sentence detector 102 of FIG. 1. In the example of FIG. 3, raw text 302, such as a document, one or more sentences, or one or more sentence fragments, is obtained. Pre-training, such as feature extraction, is performed on the raw text 302, at 304. The pre-training is performed at the word-level and generates word representations 306, such as feature vectors that represent words in the raw text 302. For example, the word representations 306 include a first word representation w1, a second word representation w2, and an mth word representation wm, where m can be any positive integer.

The word representations 306 and in-domain sentences 308, including a first sentence s1, a second sentence s2, and an nth sentence sn, where n can be any positive integer, are used to build an embedder for neural sentence embedding, at 310. The in-domain sentences 308 may include or correspond to the training data set 110 of FIG. 1. In a particular implementation, the embedder includes a long short-term memory (LSTM) network. In another particular implementation, the embedder includes a universal sentence encoder (USE). In another particular implementation, the embedder includes embeddings for language models (ELMo).

The embedder is configured to generate embedding vectors based on the in-domain sentences 308 and the word representations 306. For example, the embedder generates sentence embeddings 312 and embedding vectors 314 (e.g., in-domain sentences represented by the sentence embeddings 312). The embedding vectors 314 include a first embedding vector ev1, a second embedding vector ev2, and an nth embedding vector evn. The embedding vectors 314 are reduced dimensionality representations of the in-domain sentences 308. For example, the embedding vectors 314 (e.g., the sentence representations) can be visualized as representing points in a feature space (also referred to as an "embedding"), where two points that are near each other in the feature space are more similar to one another than two points that are further away from each other. In a particular implementation, the embedding vectors 314 have values that indicate whether certain words, phrases, sentences, or other language features are present (or detected) in the in-domain sentences 308.

The embedding vectors 314 are used to train an autoencoder, at 316. For example, the embedding vectors 314 are used to train an encoder 318 and a decoder 320. The encoder 318 and the decoder 320 make up the autoencoder, such as the autoencoder 106 of FIG. 1. The encoder 318 is configured to generate a representation of the embedding vectors, and the decoder 320 is configured to generate a reconstruction of the embedding vectors, as described with reference to FIG. 1. After training, a reconstruction error output by the autoencoder (e.g., the encoder 318 and the decoder 320) indicates whether input text is an in-domain sentence or an out-of-domain sentence, as described with reference to FIG. 1. This task (e.g., identifying objects of a specific class by learning from a training set containing only objects of that class) is often referred to as "one-class classification." Thus, FIG. 3 illustrates an example of training an autoencoder (e.g., the encoder 318 and the decoder 320) to perform one-class classification (e.g., based on the in-domain sentences 308).

Figure 4:
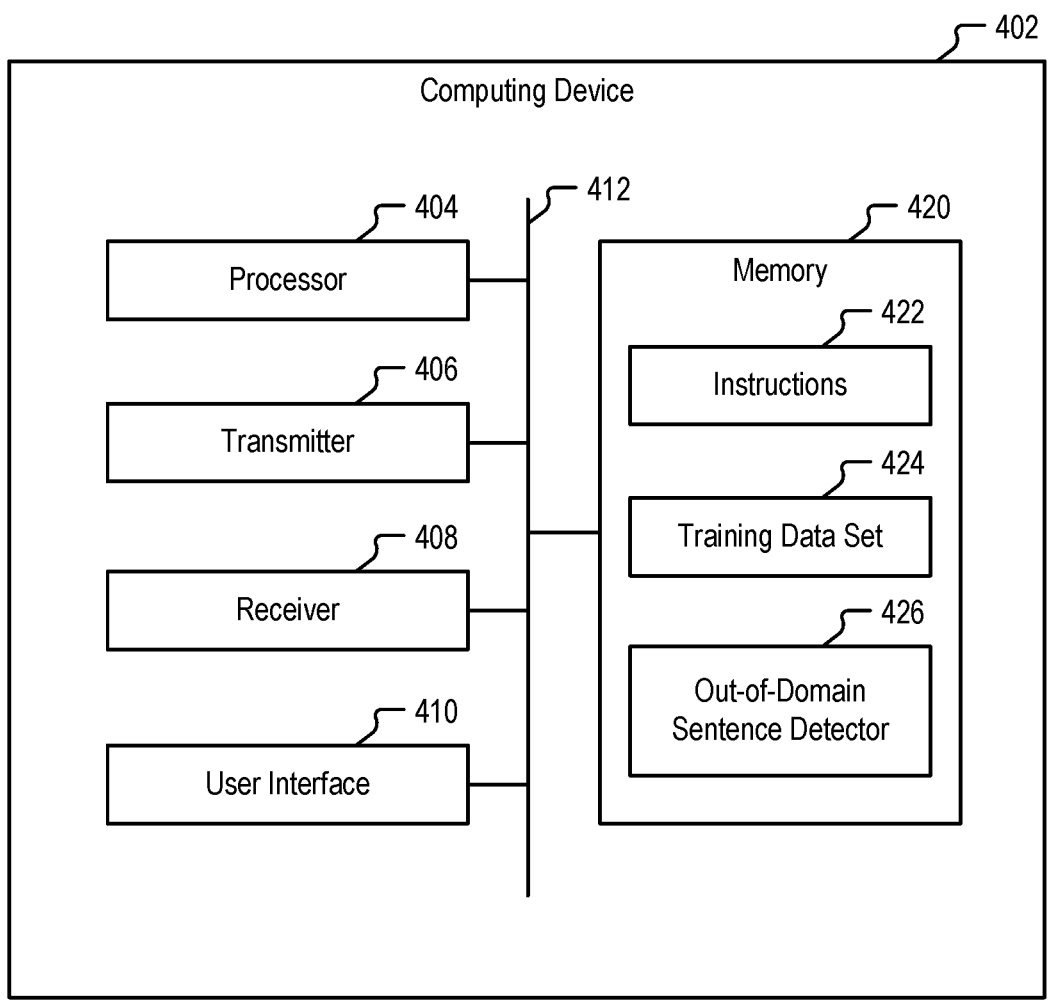
FIG. 4 is a block diagram of a computing device configured to train an out-of-domain sentence detector.

FIG. 4 illustrates a diagram of a computing device 402 configured to train an out-of-domain sentence detector 426. The computing device 402 may include or correspond to a desktop computer, a laptop computer, a tablet computer, a server, a mainframe, or any other type of computing device.

The computing device 402 includes a processor 404, a transmitter 406, a receiver 408, a user interface 410, and a memory 420. The processor 404, the transmitter 406, the receiver 408, the user interface 410, and the memory 420 may be coupled together via a bus 412 (or other connection). The example illustrated in FIG. 4 is not intended to be limiting, and in other implementations, one or more of the processor 404, the transmitter 406, the receiver 408, the user interface 410, the bus 412, and the memory 420 are optional, or more components may be included in the computing device 402.

The transmitter 406 is configured to enable the computing device 402 to send data to one or more other devices via direct connection or via one or more networks, and the receiver 408 is configured to enable the computing device 402 to receive data from one or more other devices via direct connection or via one or more networks. The one or more networks may include Institute of Electrical and Electronics Engineers (IEEE) 802 wireless networks, Bluetooth networks, telephone networks, optical or radio frequency networks, or other wired or wireless networks. In some implementations, the transmitter 406 and the receiver 408 may be replaced with a transceiver that enables sending and receipt of data from one or more other devices.

The user interface 410 is configured to facilitate user interaction. For example, the user interface 410 is adapted to receive input from a user, to provide output to a user, or a combination thereof. In some implementations, the user interface 410 conforms to one or more standard interface protocols, including serial interfaces (e.g., universal serial bus (USB) interfaces or IEEE interface standards), parallel interfaces, display adapters, audio adaptors, or custom interfaces. In some implementations, the user interface 410 is configured to communicate with one or more input/output devices, such as some combination of buttons, keyboards, pointing devices, displays, speakers, microphones, touch screens, and other devices.

The memory 420 includes volatile memory devices (e.g., random access memory (RAM) devices), nonvolatile memory devices (e.g., read-only memory (ROM) devices, programmable read-only memory, and flash memory), or both. The memory 420 is configured to store instructions 422. The processor 404 is configured to execute the instructions 422 to perform the operations described herein. To illustrate, the processor 404 may execute the instructions 422 to obtain a training data set 424 and use the training data set 424 to generate and train the out-of-domain sentence detector 426, in a similar manner to as described with reference to FIG. 1. For example, in a particular implementation, the instructions 422 include classifier training instructions, additional text data generation instructions, autoencoder training instructions, forcing function instructions, and combining instructions. The out-of-domain sentence detector 426 may be stored at the memory 420 for execution by the computing device 402. In some implementations, a pool of example sentences is stored at the memory 420, and example sentences from the pool may be used as additional text data in training the out-of-domain sentence detector 426. Alternatively, the pool may be external to the computing device 402 and accessible to the computing device 402, such as via the transmitter 406 or the receiver 408. Additionally, or alternatively, the transmitter 406 may be configured to transmit the out-of-domain sentence detector 426 to a different device for execution at the different device.

Figure 5:
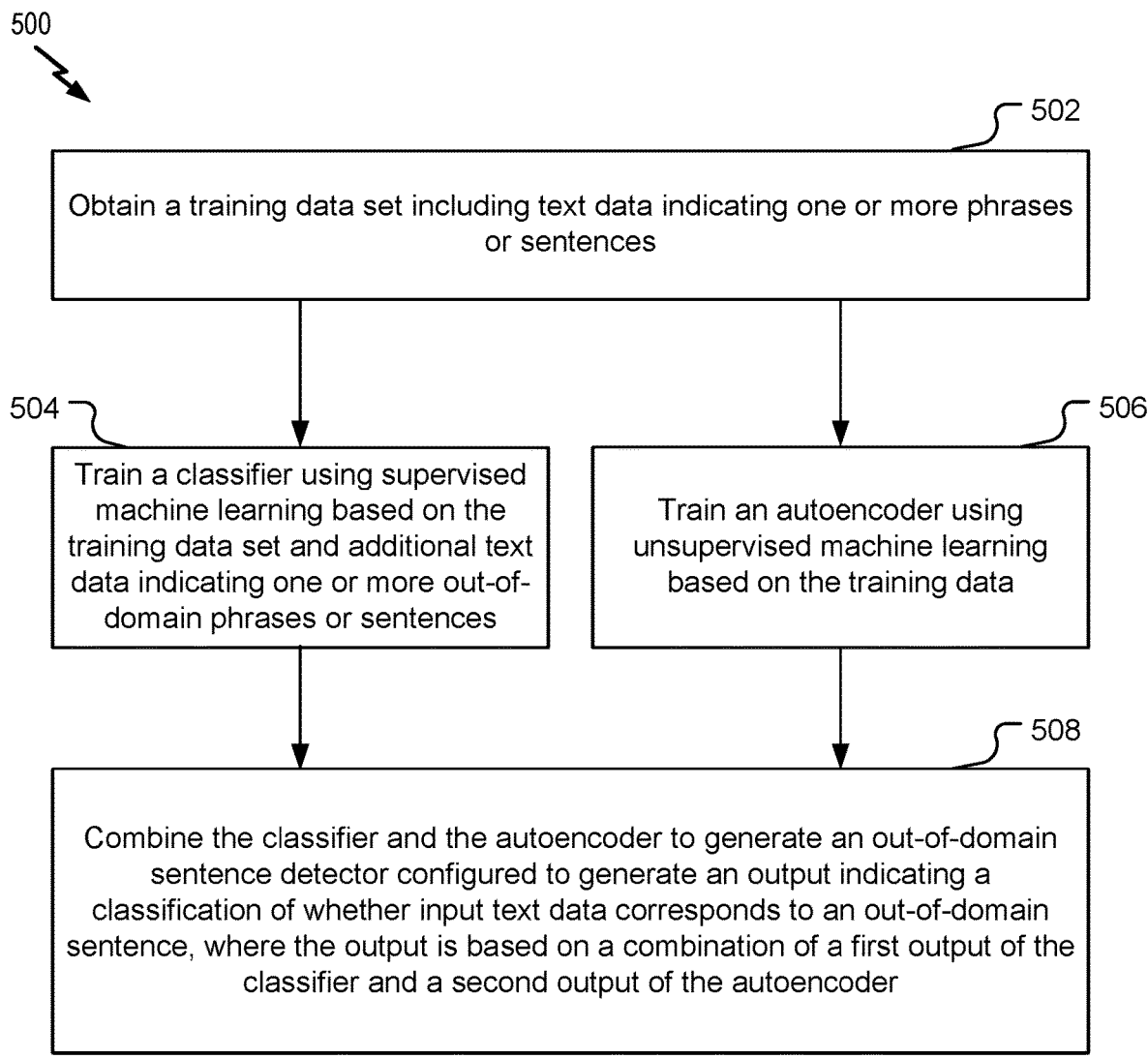
FIG. 5 is a flowchart of a method for training an out-of-domain sentence detector.

FIG. 5 is a flowchart of a method 500 for training an out-of-domain sentence detector. In an illustrative example, the method 500 is performed by the system 100 of FIG. 1 or the computing device 402 of FIG. 4.

The method 500 includes obtaining a training data set including text data indicating one or more phrases or sentences, at 502. For example, the system 100 obtains the training data set 110, such as from a customer.

The method 500 includes training a classifier using supervised machine learning based on the training data set and additional text data indicating one or more out-of-domain phrases or sentences, at 504. For example, the classifier 104 is trained using the training data set 110 and the additional text data 114 (e.g., text data indicating one or more out-of-domain phrases or sentences). In a particular implementation, the training data set and at least a portion of the additional text data are obtained from a customer.

The method 500 includes training an autoencoder using unsupervised machine learning based on the training data, at 506. For example, the autoencoder 106 is trained using the training data set 110 (e.g., the in-domain training examples without the labels). In a particular implementation, the autoencoder is configured to output a reconstruction error, and the second output is based on application of a forcing function to the reconstruction error. For example, the autoencoder 106 generates the reconstruction error 118, and the forcing function 120 is applied to the reconstruction error 118 to generate the second output 124.

The method 500 further includes combining the classifier and the autoencoder to generate an out-of-domain sentence detector configured to generate an output indicating a classification of whether input text data corresponds to an out-of-domain sentence, at 508. The output is based on a combination of a first output of the classifier and a second output of the autoencoder. For example, the out-of-domain sentence detector 102 includes the combiner 108 that is configured to generate the classification 126 based on a combination of the first output 122 and the second output 124. The classification 126 indicates whether the input text data 116 corresponds to an out-of-domain sentence (or an in-domain sentence). In a particular implementation, the output includes an average of the first output and a value based on the second output. In another particular implementation, the output includes a weighted average of the first output and a value based on the second output.

In a particular implementation, at least a portion of the additional text data is obtained from a pool of example sentences. For example, at least a portion of the additional text data 114 may be obtained from the example sentence pool 112. In this implementation, the method 500 may further include clustering the example sentences of the pool into clusters in a feature space, where a distance between clusters in the feature space indicates a similarity between sentence examples in the clusters. For example, the example sentences in the example sentence pool 112 may be clustered into clusters in a feature space, as described with reference to FIGS. 2A and 2B. In some implementations, the method 500 also includes obtaining an out-of-domain example sentence, mapping the out-of-domain example sentence into the feature space, and including a particular example sentence from the pool in the portion of the additional text data based on a distance in the feature space between the out-of-domain example sentence and the particular example sentence failing to satisfy a first threshold. For example, as described with reference to FIG. 2A, the particular sentence 204 is added to the additional text data 210 (e.g., a group of one or more out-of-domain example sentences) based on the distance in the feature space between the particular sentence 204 and the out-of-domain example sentence 202 (e.g., an out-of-domain sentence provided by a customer) failing to satisfy the first threshold 206. The distance may include a cosine distance or an $L^2$ distance, as non-limiting examples. In some implementations, the method 500 also includes mapping an example sentence from the training data set into the feature space and including a particular example sentence from the pool in the portion of the additional text data based on a distance in the feature space between the example sentence and the particular example sentence satisfying a second threshold. For example, as described with reference to FIG. 2B, the particular sentence 224 is added to the additional text data 210 (e.g., a group of one or more out-of-domain example sentences) based on the distance in the feature space between the particular sentence 224 and the in-domain example sentence 222 (e.g., an in-domain sentence provided by a customer) satisfying the second threshold 208.

In some implementations, the training data set includes a first number of training examples, the additional text data includes a second number of training examples, and the first number and the second number are the same. For example, the number of training examples in the additional text data 210 (or the additional text data 114 of FIG. 1) that are received from the customer, obtained from the example sentence pool 112, or a combination thereof, is equal to the number of training examples in the training data set 110. Having a substantially equal number of in-domain training examples and out-of-domain training examples may improve training the classifier.

In a particular implementation, providing the training data set to the autoencoder includes generating one or more embedding vectors based on the training data set and providing the one or more embedding vectors to the autoencoder. For example, as described with reference to FIG. 3, the embedding vectors 314 may be generated based on the word representations 306 and the in-domain sentences 308. In this implementation, the one or more embedding vectors may be generated using a long short-term memory (LSTM) network, a universal sentence encoder (USE), or embeddings for language models (ELMo), as non-limiting examples.

One benefit provided by method 500 is the generation and training of an out-of-domain sentence detector that is more robust and more accurate than other out-of-domain sentence detectors. By accurately detecting out-of-domain sentences, proper actions may be taken, such as requesting a user to resubmit a request that is more on-topic, instead of providing a response that is possibly outside of what the user would expect to a given request.

Figure 6:
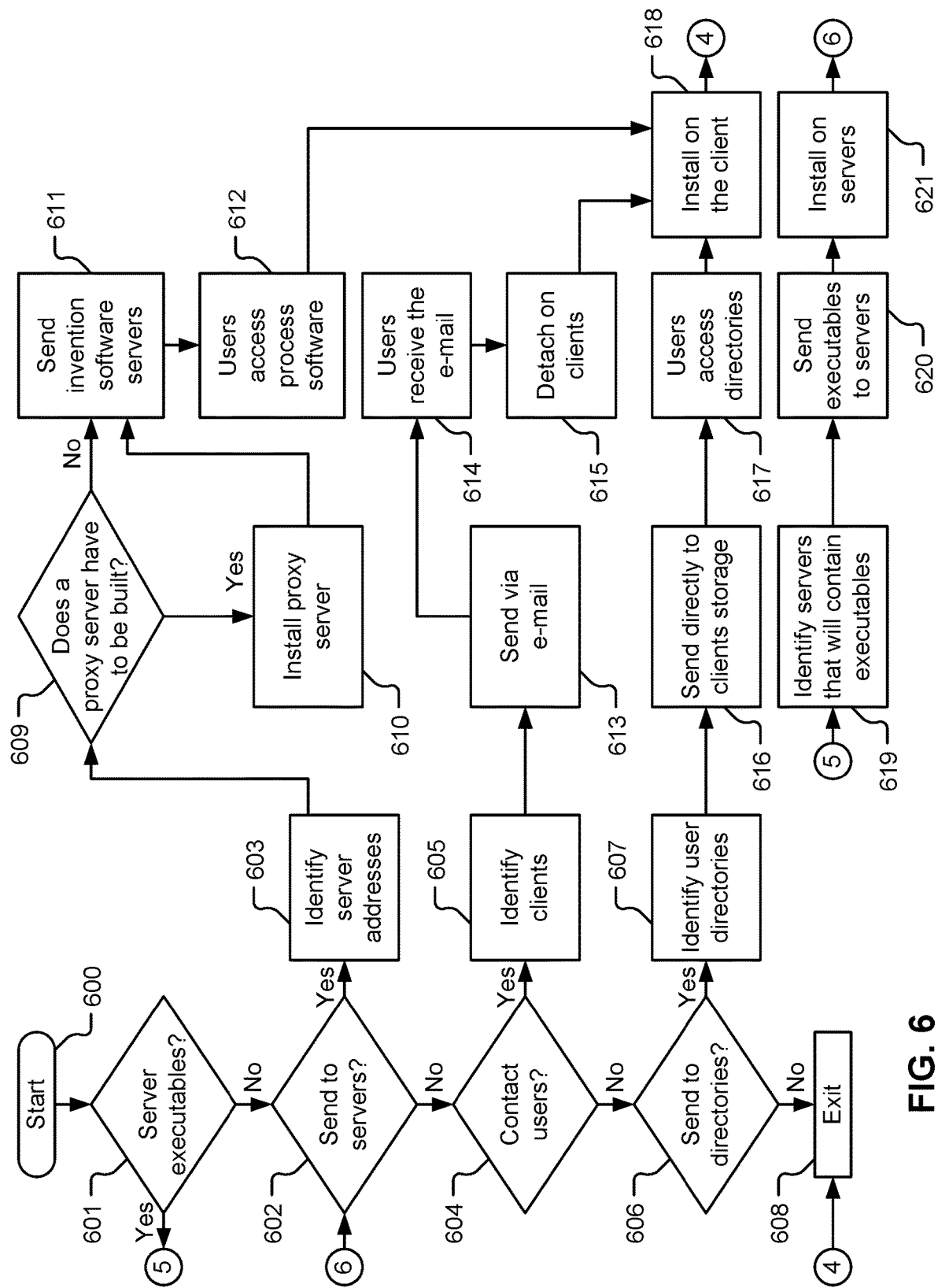
FIG. 6 is a flowchart that illustrates an example of a method of deploying an out-of-domain sentence detector.

FIG. 6 is a flowchart that illustrates an example of a method of deploying an out-of-domain sentence detector according to an implementation of the present invention. While it is understood that process software, such as the out-of-domain sentence detector 102 of FIG. 1 or the out-of-domain sentence detector 426 of FIG. 4, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 600 begins the deployment of the process software. An initial step is to determine if there are any programs that will reside on a server or servers when the process software is executed (601). If this is the case, then the servers that will contain the executables are identified (619). The process software for the server or servers is transferred directly to the servers' storage via FTP or some other protocol or by copying though the use of a shared file system (620). The process software is then installed on the servers (621).

Next, a determination is made on whether the process software is to be deployed by having users access the process software on a server or servers (602). If the users are to access the process software on servers, then the server addresses that will store the process software are identified (603).

A determination is made if a proxy server is to be built (609) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (610). The process software is sent to the (one or more) servers either via a protocol such as FTP, or it is copied directly from the source files to the server files via file sharing (611). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (612). Another embodiment is to have the servers automatically copy the process software to each client and then run the installation program for the process software at each client computer. The user executes the program that installs the process software on his client computer (618) and then exits the process (608).

In step 604 a determination is made whether the process software is to be deployed by sending the process software to users via e-mail. The set of users where the process software will be deployed are identified together with the addresses of the user client computers (605). The process software is sent via e-mail to each of the users' client computers (613). The users then receive the e-mail (614) and then detach the process software from the e-mail to a directory on their client computers (615). The user executes the program that installs the process software on his client computer (618) and then exits the process (608).

Lastly, a determination is made on whether the process software will be sent directly to user directories on their client computers (606). If so, the user directories are identified (607). The process software is transferred directly to the user's client computer directory (616). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (617). The user executes the program that installs the process software on his client computer (618) and then exits the process (608).

Figure 7:
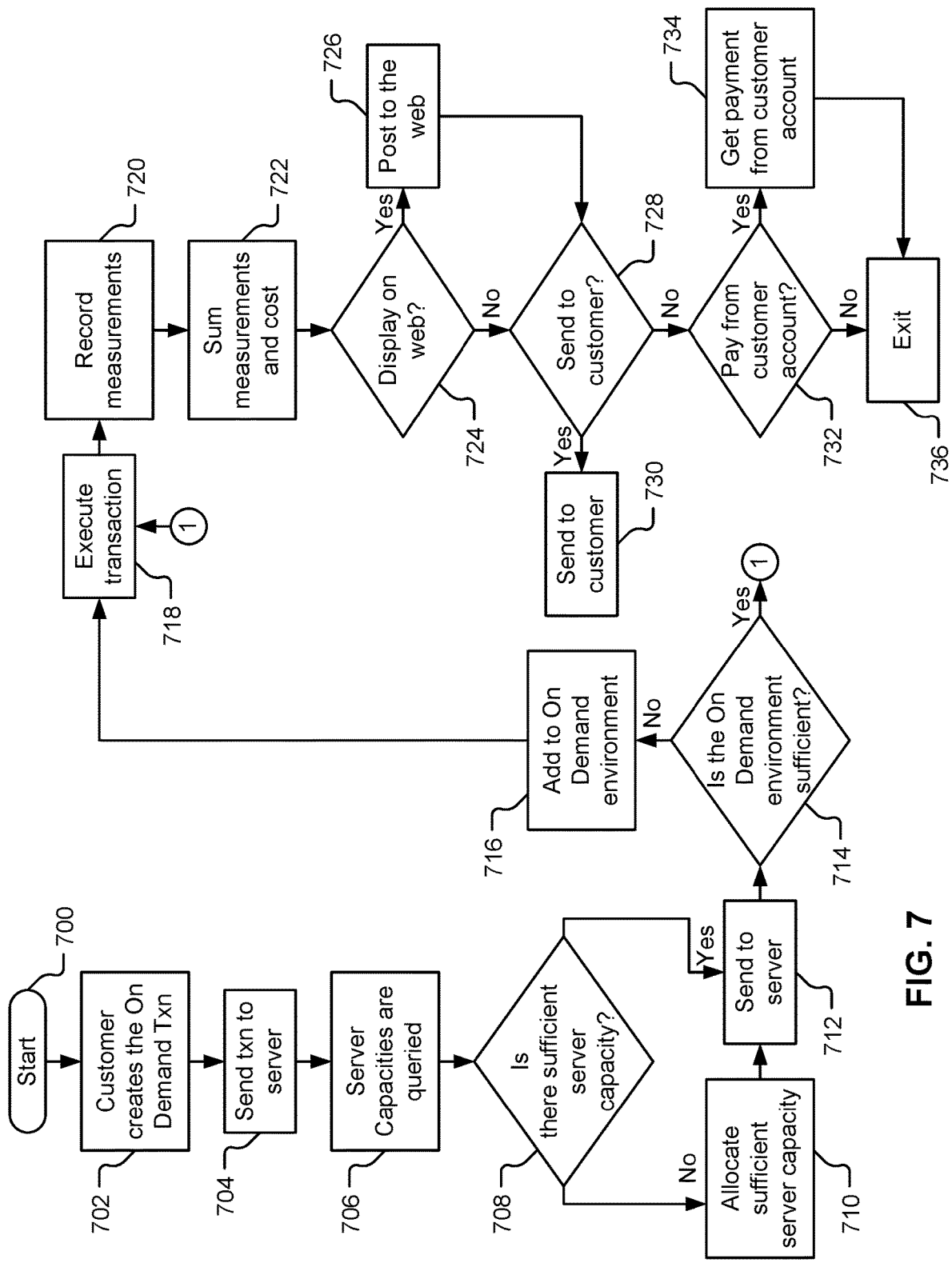
FIG. 7 is a flowchart that illustrates an example of using an out-of-domain sentence detector in an on demand context according to an implementation of the present disclosure.

FIG. 7 is a flowchart that illustrates an example of a method of using an out-of-domain sentence detector in an on demand context. In FIG. 7, the process software, such as the out-of-domain sentence detector 102 of FIG. 1 or the out-of-domain sentence detector 426 of FIG. 4, may also be shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 700 begins the On Demand process. A transaction is created that contains the unique customer identification, the requested service type, and any service parameters that further specify the type of service (702). The transaction is then sent to the main server (704). In an On Demand environment, the main server can initially be the only server, and then as capacity is consumed other servers are added to the On Demand environment.

The server central processing unit (CPU) capacities in the On Demand environment are queried (706). The CPU requirement of the transaction is estimated, and then the server's available CPU capacity in the On Demand environment is compared to the transaction CPU requirement to see if there is sufficient CPU available capacity in any server to process the transaction (708). If there is not sufficient server CPU available capacity, then additional server CPU capacity is allocated to process the transaction (710). If there was already sufficient available CPU capacity, then the transaction is sent to a selected server (712).

Before executing the transaction, a check is made of the remaining On Demand environment to determine if the environment has sufficient available capacity for processing the transaction. This environment capacity consists of such things as, but not limited to, network bandwidth, processor memory, storage etc. (714). If there is not sufficient available capacity, then capacity will be added to the On Demand environment (716). Next the required software to process the transaction is accessed, loaded into memory, and then the transaction is executed (718).

The usage measurements are recorded (720). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (722).

If the customer has requested that the On Demand costs be posted to a web site (724), then they are posted thereto (726). If the customer has requested that the On Demand costs be sent via e-mail to a customer address (728), then they are sent (730). If the customer has requested that the On Demand costs be paid directly from a customer account (732), then payment is received directly from the customer account (734). On Demand process proceeds to 736 and exits.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
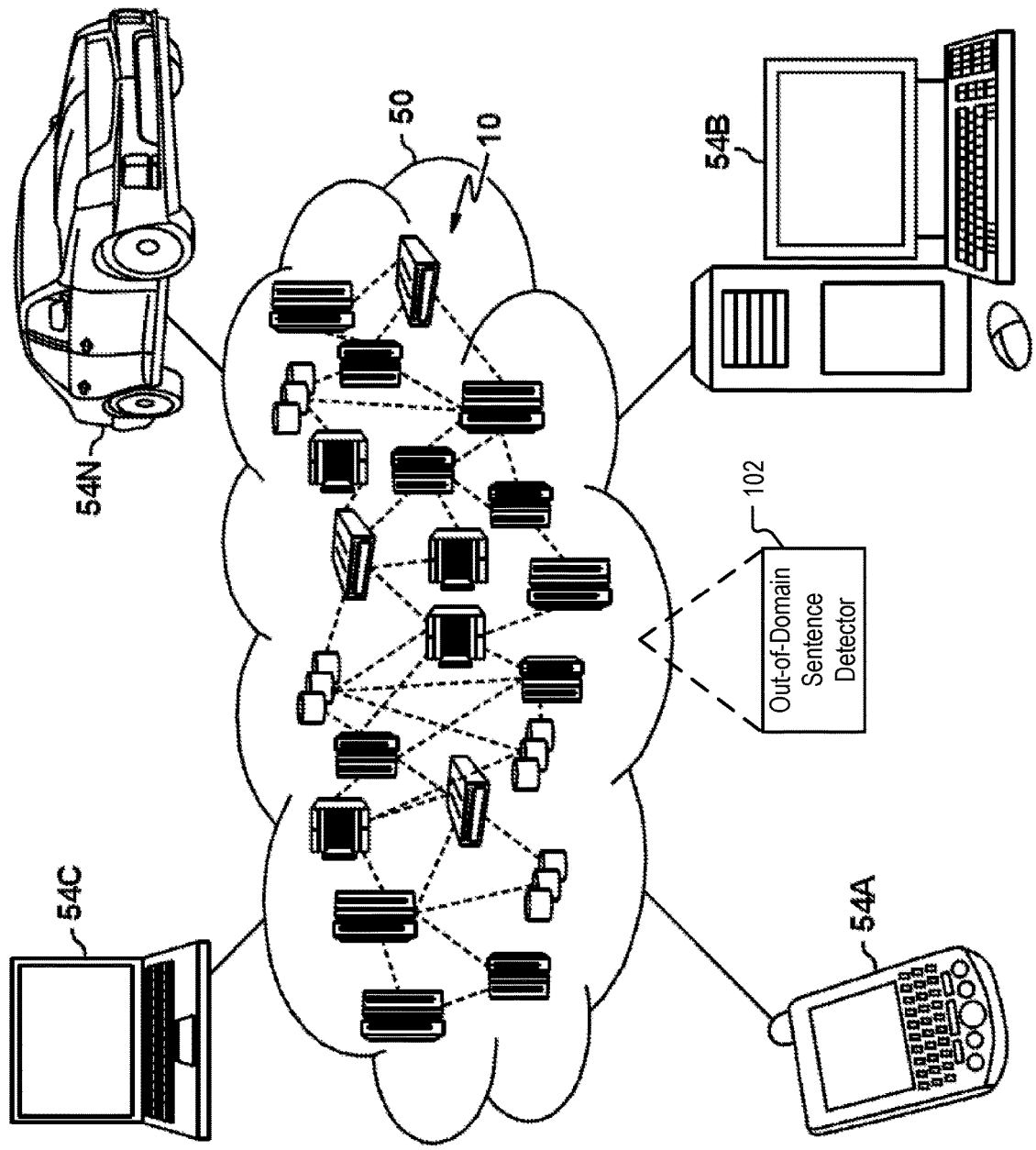
FIG. 8 depicts a cloud computing environment according to an implementation of the present disclosure.

Referring to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser). In a particular implementation, one or more of the nodes 10 include the out-of-domain sentence detector 102 of FIG. 1.

Figure 9:
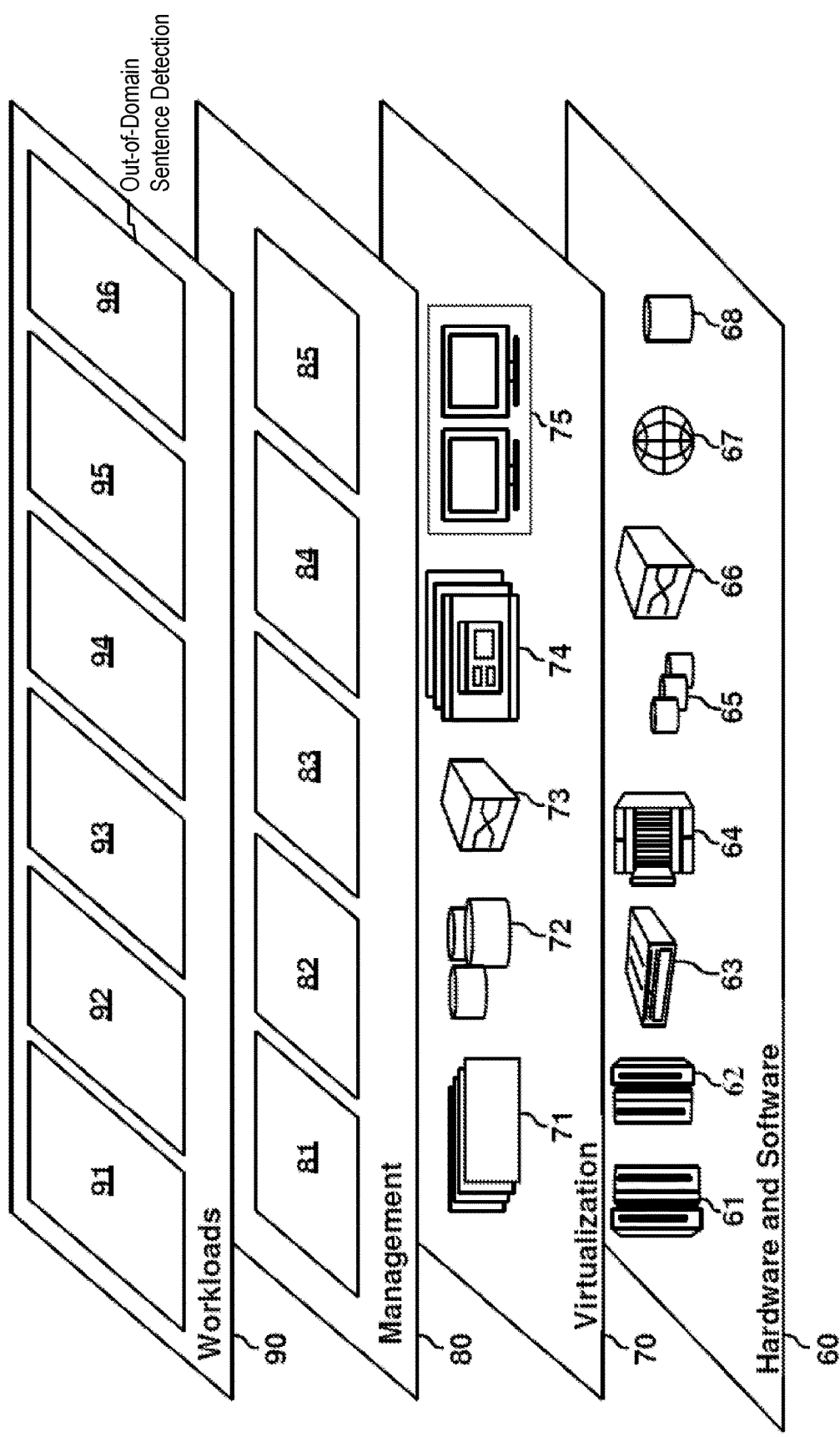
FIG. 9 depicts abstraction model layers according to an implementation of the present disclosure.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and out-of-domain sentence detection 96. For example, the out-of-domain sentence detection 96 may use or have access to an out-of-domain sentence detector, such as the out-of-domain sentence detector 102 of FIG. 1 or the out-of-domain sentence detector 426 of FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of training an out-of-domain sentence detector, the computer-implemented method comprising:
    obtaining a training data set including text data indicating one or more phrases or sentences;
    training a classifier using supervised machine learning based on the training data set and additional text data indicating one or more out-of-domain phrases or sentences;
    training an autoencoder using unsupervised machine learning based on the training data; and
    combining the classifier and the autoencoder to generate the out-of-domain sentence detector configured to generate an output indicating a classification of whether input text data corresponds to an out-of-domain sentence, wherein the output is based on a combination of a first output of the classifier and a second output of the autoencoder.

2. The computer-implemented method of claim 1, wherein the training data set and at least a portion of the additional text data are obtained from a customer.

3. The computer-implemented method of claim 1, wherein at least a portion of the additional text data is obtained from a pool of example sentences.

4. The computer-implemented method of claim 3, further comprising:
    clustering the example sentences of the pool into clusters in a feature space, wherein a distance between clusters in the feature space indicates a similarity between sentence examples in the clusters.

5. The computer-implemented method of claim 4, further comprising:
    obtaining an out-of-domain example sentence;
    mapping the out-of-domain example sentence into the feature space; and
    including a particular example sentence from the pool in the portion of the additional text data based on a distance in the feature space between the out-of-domain example sentence and the particular example sentence failing to satisfy a first threshold.

6. The computer-implemented method of claim 5, wherein the distance comprises a cosine distance.

7. The computer-implemented method of claim 5, wherein the distance comprises an $L^2$ distance.

8. The computer-implemented method of claim 4, further comprising:
mapping an example sentence from the training data set into the feature space; and
including a particular example sentence from the pool in the portion of the additional text data based on a distance in the feature space between the example sentence and the particular example sentence satisfying a second threshold.

9. The computer-implemented method of claim 1, wherein the training data set includes a first number of training examples, wherein the additional text data includes a second number of training examples, and wherein the first number and the second number are the same.

10. The computer-implemented method of claim 1, wherein the autoencoder is configured to output a reconstruction error, and wherein the second output is based on application of a forcing function to the reconstruction error.

11. The computer-implemented method of claim 1, wherein providing the training data set to the autoencoder comprises generating one or more embedding vectors based on the training data set and providing the one or more embedding vectors to the autoencoder.

12. The computer-implemented method of claim 11, wherein the one or more embedding vectors are generated using a long short-term memory (LSTM) network, a universal sentence encoder (USE), or embeddings for language models (ELMo).

13. The computer-implemented method of claim 1, wherein the output comprises an average of the first output and a value based on the second output.

14. The computer-implemented method of claim 1, wherein the output comprises a weighted average of the first output and a value based on the second output.

15. An apparatus comprising:
a processor; and
a memory coupled to the processor and storing instructions that, when executed by the processor, cause the processor to perform operations comprising:
obtaining a training data set including text data indicating one or more phrases or sentences;
training a classifier using supervised machine learning based on the training data set and additional text data indicating one or more out-of-domain phrases or sentences;
training an autoencoder using unsupervised machine learning based on the training data; and
combining the classifier and the autoencoder to generate an out-of-domain sentence detector configured to generate an output indicating a classification of whether input text data corresponds to an out-of-domain sentence, wherein the output is based on a combination of a first output of the classifier and a second output of the autoencoder.

16. The apparatus of claim 15, wherein the memory is further configured to store a pool of example sentences, and wherein at least a portion of the additional text data includes one or more example sentences from the pool.

17. The apparatus of claim 15, further comprising a transmitter configured to transmit the out-of-domain sentence detector to a device for execution at the device.

18. A computer program product for training an out-of-domain sentence detector, the computer program product comprising a computer readable storage medium having program instructions embodied therewith, the program instructions executable by a processor to cause the processor to perform operations comprising:
obtaining, at the processor, a training data set including text data indicating one or more phrases or sentences;
training, at the processor, a classifier using supervised machine learning based on the training data set and additional text data indicating one or more out-of-domain phrases or sentences;
training, at the processor, an autoencoder using unsupervised machine learning based on the training data; and
combining the classifier and the autoencoder to generate the out-of-domain sentence detector configured to generate an output indicating a classification of whether input text data corresponds to an out-of-domain sentence, wherein the output is based on a combination of a first output of the classifier and a second output of the autoencoder.

19. The computer program product of claim 18, wherein the operations further comprise:
obtaining, at the processor, an out-of-domain example sentence;
mapping, at the processor, the out-of-domain example sentence into a feature space; and
including, at the processor, a particular example sentence from a pool of example sentences in the additional text data based on a distance in the feature space between the out-of-domain example sentence and the particular example sentence failing to satisfy a first threshold.

20. The computer program product of claim 18, wherein the operations further comprise:
mapping, at the processor, an example sentence from a training data set into a feature space; and
including, at the processor, a particular example sentence from a pool of example sentences in the additional text data based on a distance in the feature space between the example sentence and the particular example sentence satisfying a second threshold.

* * * * *